United States Patent [19]
Kroening et al.

[11] Patent Number: 6,080,207
[45] Date of Patent: Jun. 27, 2000

[54] SYSTEM AND METHOD OF CREATING AND DELIVERING SOFTWARE

[75] Inventors: James L. Kroening, Dakota Dunes; Darrin J. Fangman, McCook; James J. Marshall, Jefferson; Richard Peasley, Elk Point, all of S. Dak.

[73] Assignee: Gateway 2000, Inc., North Sioux City, S. Dak.

[21] Appl. No.: 09/090,118

[22] Filed: Jun. 4, 1998

[51] Int. Cl.[7] .................................................. G06F 9/445
[52] U.S. Cl. .............................................................. 717/11
[58] Field of Search ................................ 395/712; 717/11

[56] References Cited

U.S. PATENT DOCUMENTS

| | | | |
|---|---|---|---|
| 5,604,906 | 2/1997 | Murphy et al. | 717/11 |
| 5,675,748 | 10/1997 | Ross | 710/104 |
| 5,703,788 | 12/1997 | Shei et al. | 716/4 |
| 5,794,052 | 8/1998 | Harding | 717/11 |
| 5,797,015 | 8/1998 | Daniels, Jr. et al. | 717/11 |
| 5,835,911 | 11/1998 | Hakagawa et al. | 707/203 |
| 5,842,024 | 11/1998 | Choye et al. | 717/11 |
| 5,919,247 | 7/1999 | Van Hoff et al. | 709/217 |
| 5,960,460 | 9/1999 | Marasco et al. | 711/162 |
| 5,974,547 | 10/1999 | Klimenko | 713/2 |
| 6,012,136 | 1/2000 | Brown | 712/35 |

OTHER PUBLICATIONS

Weber, D.W.; "Change Sets Versus Change Packages: Comparing Implementations of Change–Based SCM". Continuus Website[online]. The 7th Annual SCMC. Accessed online Oct. 29, 1999. Retrieved from the Internet: Http://www.continuus.com, May 1997.

Symantec Corporation; "Disk Cloning Technology for the Overburdened IT Professional". Symantec website. Accessed on Oct. 29, 1999. Retrieved from the Internet: Http://www.symantec.com, Oct. 1998.

"PictureTaker User's Guide", Published by Lanovation, Cover page, Title page and pp. 5–9 (Aug. 1997).

*Primary Examiner*—Eric W. Stamber
*Assistant Examiner*—Kelvin E. Booker
*Attorney, Agent, or Firm*—Schwegman, Lundberg, Woessner & Kluth, P.A.

[57] ABSTRACT

A computerized system and a method for generating a custom software configuration for a hard drive of a computer system according to desired software configuration defined by a purchasing customer. The computerized system and method utilizes an image builder for creating a disk image of the desired software configuration and transferring the image to a storage device. The storage device is connected to an image server that transfers the disk image directly to the hard drive during a manufacturing and assembly process of the computer system. Once the computer system is assembled, the image server broadcasts the disk image to the computer system via a wired or wireless connection.

41 Claims, 3 Drawing Sheets

SYSTEM AND METHOD OF CREATING AND DELIVERING SOFTWARE

TECHNICAL FIELD OF THE INVENTION

The present invention relates generally to computer systems, and, in particular, to a system and method of creating and delivering software to the computer systems using an image builder.

BACKGROUND OF THE INVENTION

When software is installed on a hard drive of a personal computer, the hard drive must first be initialized and formatted. Software is then physically copied or loaded onto the hard drive from a floppy disk or a CD ROM disk. A disadvantage of physically installing software in this manner is the time required to do so.

When personal computers are mass produced, a manufacturer can take advantage of a common software configuration when loading software onto the hard drives. A computer system is set up as a model system having the desired software configuration that is to be duplicated in other personal computers. Once the model system has been set up, a digital image of the hard drive is created. The digital image is essentially a "picture" of the hard drive. Creating a digital image of the hard drive is well known to those skilled in the art. Once this image is created, it is distributed to the other hard drives requiring the same configuration. The result is that all of the computer systems receiving a copy of the image during their manufacturing and assembly process will have the same hard drive contents as the model system.

For software upgrades on existing computer systems, an image is created for a set of changes to be made to the hard drive and the set of changes are then transferred to the computer systems. This results in quicker computer upgrades, which in turn provides a cost savings, particularly when a large number of computer systems are to be upgraded.

Nonetheless, a disadvantage of this approach requires that a model system first be set up utilizing the same operating system and the same set of applications as desired on the other computer systems. To set up the model system, the software must be physically loaded from a disk onto the model computer system before the image can be created for transferring to the other computers.

Even if a group of computers are networked together, a baseline configuration must also be established on the file server which requires that the file server physically be set up with the desired software configuration from a disk. The file server then allows the networked computers to have access to the new configuration. Networking prevents a system administrator from having to install software upgrades individually on each computer system. However, the upgrade must first be made to the file server which requires installation via a disk.

What is needed is a method or process for creating a desired software configuration without having to create a separate baseline configuration for each unique software configuration. This would save time and expense for a manufacturer or even a system administrator supporting a large number of computer work stations.

For the reasons stated above, and for other reasons stated below which will become apparent to those skilled in the art upon reading and understanding the present specification, there is a need in the art for a software creation/distribution process that is performed without having to physically set up a model system using a disk for each unique configuration desired.

SUMMARY OF THE INVENTION

An image builder is a computerized network for generating a custom software configuration for a hard drive of a computer system according to a desired software configuration defined by a purchasing customer. The image builder surveys a database of software configurations to identify a match for a desired configuration or identify a baseline for the desired configuration. Once the baseline is identified, the image builder performs a comparison to create a set of changes that can be combined with or edited into the baseline image "picture" to generate the desired software configuration. This linear flow process utilizes intelligence and granularity in generating the desired software configuration.

In one embodiment, a computerized system for building a custom software configuration is provided. The computerized system comprises a processor, a computer readable medium, and a plurality of computer instructions executed by the processor from the computer readable medium for performing a series of steps. The steps include receiving a desired software configuration, surveying images of preexisting software configurations for a baseline software configuration similar to the desired software configuration, comparing an image of the baseline software configuration with the desired software configuration to determine a set of changes, and generating an image of the set of changes. The computerized system further includes the step of incorporating the image of the set of changes with the image of the baseline configuration to create the desired configuration.

In another embodiment, a computer readable medium having a computer readable program code embodied thereon is provided. The computer readable code comprising a computer readable code for causing a computer to receive a desired software configuration, a computer readable code for causing a computer to survey images of preexisting software configurations for a baseline software configuration similar to the desired software configuration, a computer readable code for causing a computer to compare an image of the baseline software configuration with the desired software configuration to determine a set of changes to be made to the baseline software configuration, and computer readable code for causing a computer to generate an image of the custom software configuration. The computer readable medium further comprises a computer readable program code for causing a computer to generate an image of the custom software configuration by incorporating the image of the set of changes with the image of the baseline configuration.

In yet another embodiment, a computerized network for creating and broadcasting a customized software configuration is provided. The computerized network comprises a computer system for receiving a desired software configuration, a storage device having a plurality of software configurations stored as images, and an image builder. The image builder receives the desired software configuration and surveys the storage device for an image of a baseline software configuration similar to the desired software configuration and compares the image with the desired software configuration to determine a set of changes, wherein the image builder generates an image of the custom software configuration by incorporating the image of the set of changes with the image of the baseline configuration and stores the image of the custom software configuration on the storage device. The computerized network also comprises an image server that retrieves the image of the custom software configuration from the storage device and broadcasts the image via a wired or wireless connection.

An advantage of the image builder is that common portions of multiple software configurations are identified by the image builder and are combined with a set of changes to produce the desired software configuration without having to reestablish a new baseline for each unique configuration. This means that baselines for different product lines, i.e., desk top computers, portable laptop computers, etc., can be combined with a set of changes to generate desired custom software configurations for various products produced by a manufacturer. Not having to create a separate baseline configuration for each possible configuration saves time and expense for a manufacturer or a system administrator supporting a large number of work stations. Furthermore, since the image builder works on several levels of databases, it can generate and deliver a delta image as a fix to a computer system to provide customer support in trouble shooting and correcting software problems.

Therefore, a system and method of installing software on a hard drive of a computer system using an image builder allows custom software configurations to be generated in software and then transferred to the computer system via a floppy disk, or broadcast directly to the computer system. In different embodiments of the invention, computer systems, disk image processes, and broadcasting methods of varying scope are described. For instance, various embodiments presented herein for broadcasting the generated software configuration utilize either a wired or wireless configuration. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense.

Figure 1:
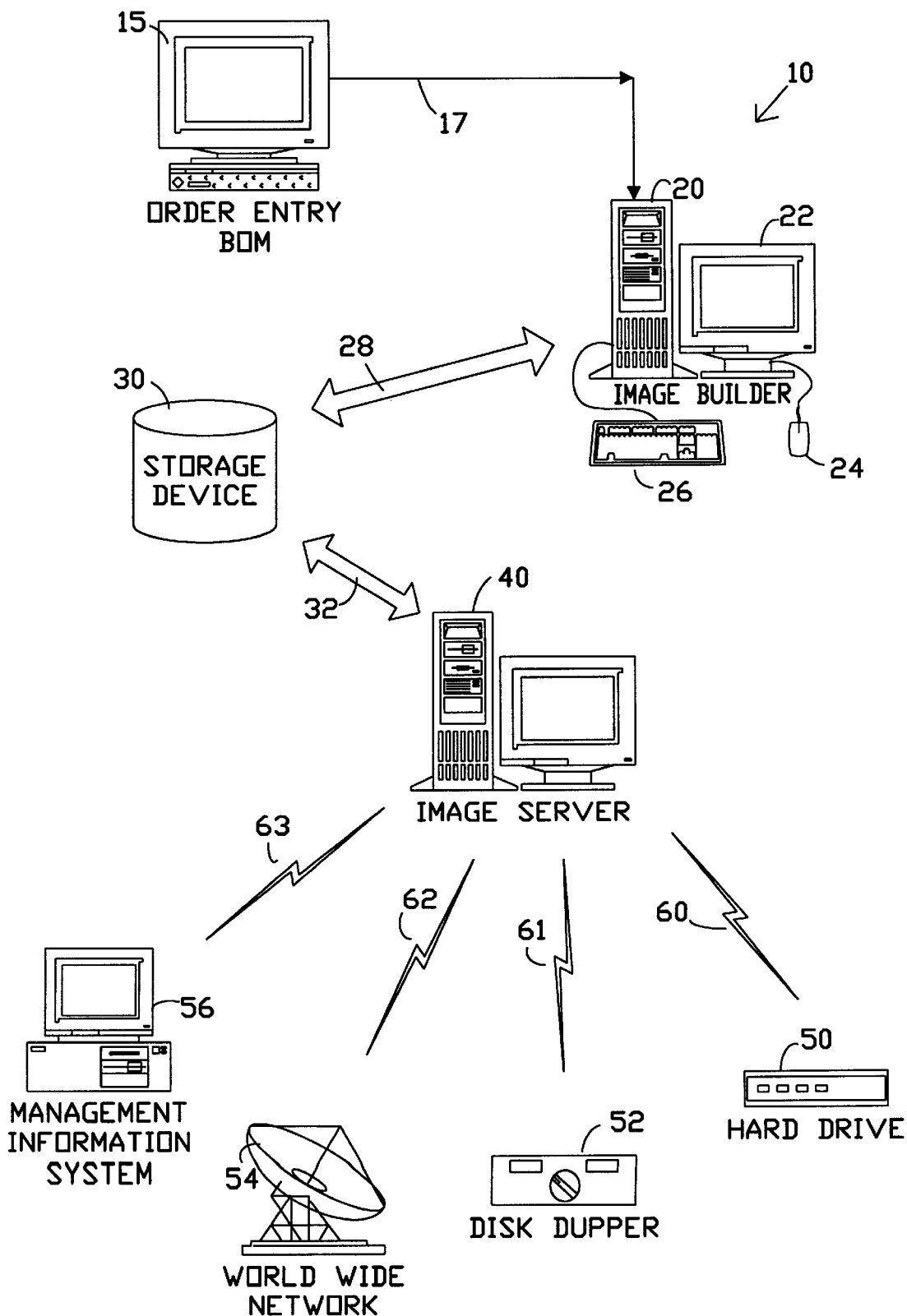
FIG. 1 is a block representation of a system for creating and delivering a disk image corresponding to a desired software configuration.

FIG. 1 illustrates a disk image process for creating and delivering a disk image corresponding to a desired software configuration. The disk image process utilizes a computerized network system 10 for creating and delivering custom software configurations defined by purchasing customers. The disk image process utilizes intelligence and granularity in generating the desired software configuration. Included within the computerized network system 10 is an image builder 20 that creates a disk image of the desired software configuration and then transfers that image to a storage device 30. The storage device 30 is connected to an image server 40 that performs the task of delivering the image. The image may be delivered directly to a hard drive 50 during a manufacturing and assembly process of a computer system. The image may also be delivered to a disk dupper 52 for duplicating the image on a computer readable medium, a ground based transmitter 54 for broadcasting the image, or to a management information system (MIS) 56.

The first step in the disk image delivery process involves entering a customer's order into an order entry system 15 to establish a bill of materials (BOM). The bill of materials includes a customer's selection of a desired software configuration for a particular computing system. Included within the bill of materials are hardware parameters of the computing system to be receiving the software configuration, including BIOS and CMOS settings plus other pertinent information as may be necessary. This information is used by the image builder to create a digital image of the desired software configuration.

In one embodiment, the order entry system 15 is a minicomputer. A mini-computer is a multi-processing system capable of supporting from four to about two hundred users simultaneously. Minicomputers are well known to those skilled in the art. For example, an IBM AS/400 minicomputer functions as the order entry system 15 in one embodiment. In terms of size and power, a minicomputer falls between a workstation and a mainframe. Equivalent inputting methods are acceptable as an alternative to using a minicomputer, such as the use of a workstation or a mainframe.

Information included within the bill of materials corresponds to the particular software configuration desired by a customer, plus specifics on the computing system receiving the software configuration. A desired configuration may be an upgrade to an application already installed on the computing system or the configuration may be a new hard drive that is to be configured with an operating system and a variety of applications. Specifics on the computing system include, but are not limited to the following parameters, hard drive size, installed accessories, current software configuration, BIOS and CMOS settings. Information corresponding to the bill of materials as generated by the order entry system is applied to the image builder over interface 17. Interface standards between a mini-computer and an image builder 20 are well known in the art.

The image builder 20 is coupled to the order entry system 15 via interface 17 for receiving the bill of materials which provides pertinent information for creating or building an image of the desired software configuration. Intelligence is provided in this step of the image delivery process because the image builder 20 sorts through a database of stored images to first determine if an image of the desired configuration has already been created for a prior computer configuration. These images are stored on a large capacity storage device 30 or multiple storage devices. If the image of the desired configuration has not previously been created, the image builder 20 selects an appropriate baseline image from the storage device 30 and then determines which incremental images are to be layered on top of the baseline image to achieve the desired final configuration.

These incremental images, which are also referred to as delta images, only contain additional information beyond the baseline image for achieving the desired software configuration. A level of granularity is thus achieved because of the linear flow process associated with achieving the desired configuration by adding a delta image to a baseline image. If the delta image is not in the data base, then the image builder constructs the appropriate delta image. Configuration numbers are assigned to all baseline images and delta images, which help the image builder 20 sort through all the possible images that can be used in the configuration process.

The actual steps that must be undertaken to create a digital image of a computing system's hard drive are well known to one skilled in the art. The image builder 20 looks at the data stream to be loaded on the computing system's hard drive 50. Since the disk image delivery process illustrated in FIG. 1 is a linear process, the image builder 20 goes through the baseline image file by file and identifies those areas that are different and determines what parts are to be replaced. File names are examined not only by their name but by their creation date. The image builder 20 looks at specific files by a specific name or code at the time of its creation.

In lieu of examining the baseline on a file by file basis, a bit by bit comparison may be performed. In addition to the image builder 20 performing this comparison task, another level of intelligence is obtained when the image builder 20 determines changes to be made in registry settings and in interrupt settings so that the new software configuration will operate properly on the computing system. If the desired software configuration is not compatible with the hardware of the computing system, then the image builder rejects the bill of materials as a non-functional configuration.

Either the entire image (baseline and delta) or just the delta image may be loaded onto a computing system (not shown). Methods of loading either image onto a computing system are well known to those skilled in the art. If the computing system's hard drive, such as the one depicted in FIG. 1, is currently configured and all that is needed is an application upgrade, then only the delta image is created and installed. However, if a new hard drive 50 is being configured, as in a manufacturing and assembly process, then the entire image is installed on the hard drive 50.

The image delivery process avoids having to create a new baseline for every image that is to be delivered. Furthermore, the image builder 20 contains editors that determine, for example, proper registry settings and also add directory information corresponding to installed applications and their file locations. An added benefit of layering information on top of a baseline is that it allows technical support personnel and software engineers to isolate problem areas and debug and correct problems as they arise. Because of the granularity, if a problem arises after a delta configuration was overlaid on top of baseline image, and that image is known to be error free, then it is easy to isolate the problem to the newly added delta configuration. Once another delta image is created with the fix, then the correct image is installed on the computing systems having the known error.

The image builder 20 is a computer having a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The image builder 20 is coupled to a monitor 22, a pointing device 24 and a keyboard 26. The image builder is not limited to any particular type of computer. In one embodiment, the image builder 20 is a PC-compatible computer running a version of the Microsoft Windows operating system. The construction and operation of such computers are well known within the art.

The monitor 22 permits the display of information for viewing by a user of the computer. The invention is not limited to any particular monitor 22. Such monitors include cathode ray tube (CRT) displays, as well as flat panel displays such as liquid crystal displays (LCD's). The pointing device 24 permits the control of the screen pointer provided by the graphical user interface of operating systems such as versions of Microsoft Windows. The invention is not limited to any particular pointing device 24. Such pointing devices include mouses, touch pads, trackballs, and point sticks. In one embodiment, the image builder 20 is a Gateway 2000, Inc., desktop personal computer, the monitor 22 includes a super-VGA CRT display, and the pointing device 24 is a mouse. Finally, the keyboard 26 permits entry of textual information into the image builder 20, as known within the art, and the image builder 20 is not limited to any particular type of keyboard.

The image builder 20 is coupled to a large volume storage device 30 via interface 28. Once the image builder 20 defines an image and assigns a corresponding configuration number, the images are stored on the storage device 30. Likewise, when the image builder 20 is creating a disk image, the storage device 30 is first surveyed to find the desired configuration or a close match to the desired configuration for establishing a baseline to build upon. The storage device 30 is not limited to any specific format or structure as long as the storage device 30 comprises a computer-readable media for interfacing. The storage device 30 may be a family of hard disk drives, a floppy disk drive (into which a floppy disk can be inserted), an optical disk drive, or a tape cartridge drive. The implemented storage device 30 may be internal to the image builder 20 or may exist as a stand lone entity, as illustrated in FIG. 1.

After the image builder 20 has created an image of the desired software configuration, the image is passed from the storage device 30 to an image server 40 via interface 32. The image server 30 is another computer system similar to the image builder 20. The image server 30 is the point of delivery for the disk image. The image server 30 may have a variety of interfaces as illustrated in FIG. 1. One illustrative embodiment has the image server coupled to a hard drive 50 via interface 60. This embodiment allows the hard drive 50 to be configured with an image of the desired software configuration before installation into a computer system. Another illustrative embodiment has the image server 30 coupled to a disk dupper 52 via interface 61. The disk dupper 52 duplicates the disk image on a computer readable medium, such as a floppy disk, a recordable CD, or a zip drive. Other means of copying the disk image are acceptable.

In still another illustrative embodiment, the image server 40 is coupled to a ground based transmitter 54 via interface 62 for wireless transmission of the disk image to an end user. Depending on the transmitter's 54 operating parameters and the transmitter's relay capabilities, the image could be transmitted anywhere in the world. In lieu of the ground based transmitter 54, the image server 40 is connected to the Internet in any particular manner, by which the invention is not limited to and which is not shown in FIG. 1. Internet connectivity is well known within the art.

In one embodiment, the image server 40 includes a modem and corresponding communication drivers to connect to the Internet via what is known in the art as a "dial-up connection." In another embodiment, the image server 40 includes an Ethernet or similar hardware card to connect to a local-area network (LAN) that itself is connected to the Internet via what is known in the art as a "direct connection"

(e.g., T1 line, etc.). In further embodiments, the image server 40 may be connected to the Internet using a cable modem or satellite Internet connectivity (as illustrated by transmitter 54).

In yet another illustrative embodiment, the image server 40 is coupled to a management information system (MIS) 56 via interface 63. Management Information Systems may be used to support the infrastructure of businesses and organizations wherein such systems are well known to one skilled in the art.

Figure 2:
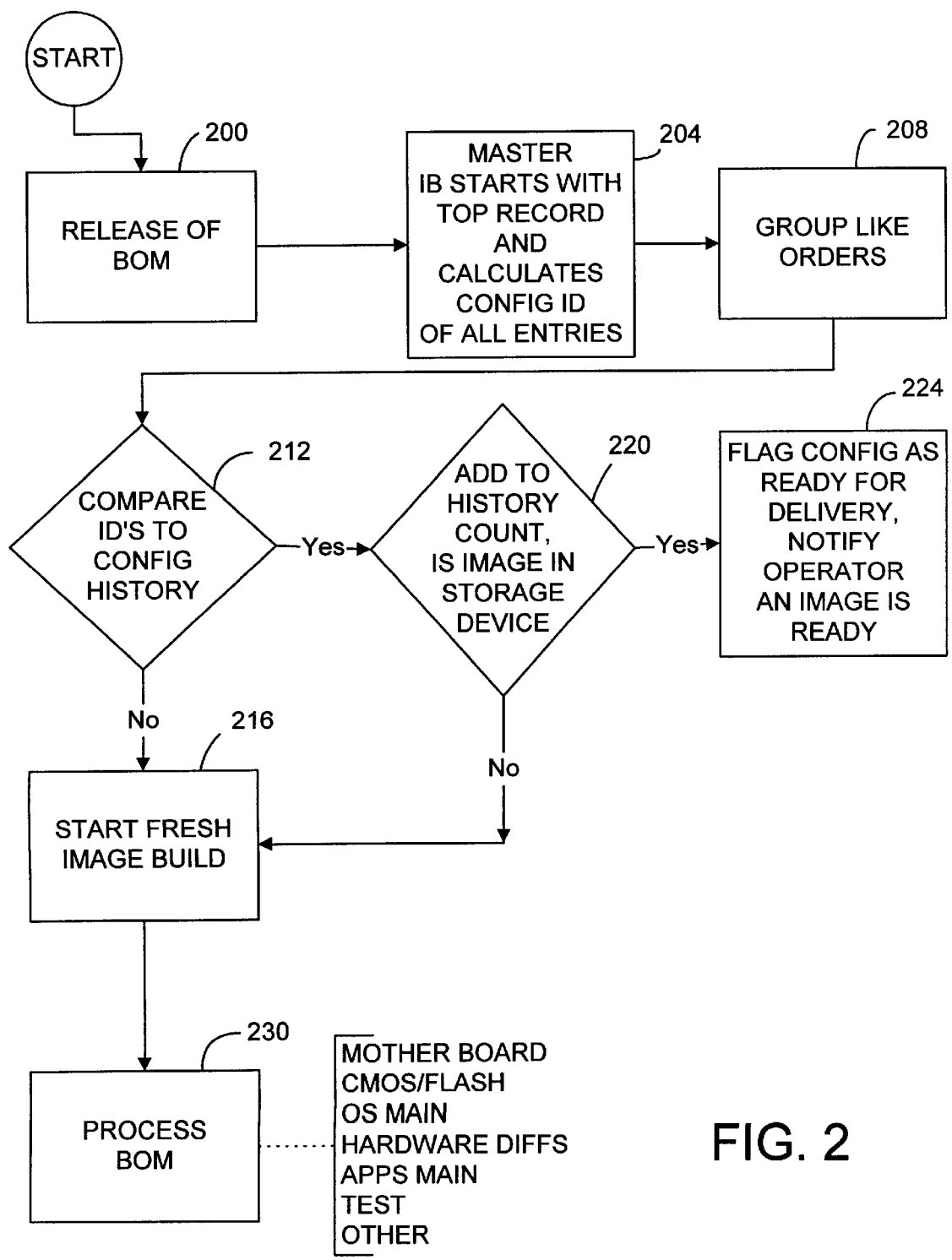
FIG. 2 is a logic flow for creating a disk image of a desired software configuration.

In referring to FIG. 2 a logic flow for creating a disk image of a desired software configuration is illustrated. Block 200 is the start of the logic flow process, which represents receipt of the customer's order. Block 200 generates the Bill of Materials (BOM).

Receipt of the bill of materials is represented by block 204. The image builder 20 starts with the top record and calculates a configuration identification (ConFig ID) of all the entries. In block 208, the image builder 20 groups like orders together. Grouping like orders together allows for increased efficiency due to the commonality between orders.

In block 212, the image builder 20 compares the configuration IDs to the configuration history. If the configuration ID corresponds to a previously configured image, then the image builder 20 looks at whether the image is in a storage device 30, as illustrated in FIG. 1. If the image is found in the storage device 30, then block 224 flags the configuration as ready for delivery and notifies an operator of the computerized network 10 that a desired image is ready. Otherwise, if the image is not found in the storage device 30, the image is created by the image builder 20 according to block 216 as a fresh build. As part of the fresh build process, block 230 requires the image builder 20 to process the bill of materials to determine the parameters for building an image according to the desired software configuration and ensure that they are compatible with the customer's hardware, software and special requirements. The final result or output from block 230 is an image or "digital picture" of the desired software configuration according to the bill of materials.

Figure 3:
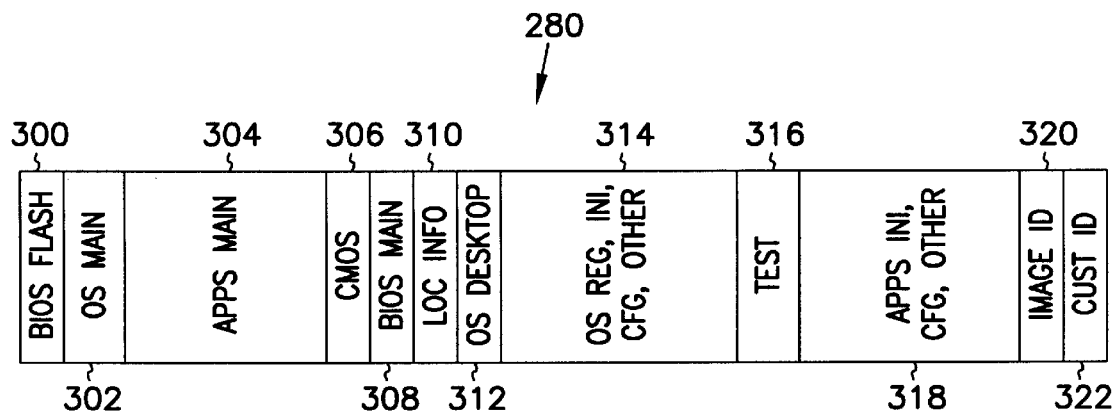
FIG. 3 is a block diagram of a structure of a disk image.

FIG. 3 illustrates an architecture of a disk image 280 as created by the image builder 20. The image builder 20 builds the image 280 in software according to a desired software configuration and delivers that image to a storage device 30. Sections of the disk image 280 are discussed in the order in which they are presented in FIG. 3. One skilled in the art will readily realize other embodiments of an image architecture.

Section 300 contains BIOS flash properties. The next two sections, sections 302 and 304, contain the main operating system and the main applications' program code or instructions. Hardware characteristics of the computing system receiving the disk image 280 are addressed by section 306 dealing with the CMOS settings, section 308 includes the main BIOS instructions, section 310 supports LOC information and section 312 supports desktop parameters for the main operating system.

Section 314 supports information including, but not limited to the following: operating system registers, initialization information and configurations files. Section 316 includes test information. Similar to section 314, section 318 includes, but is not limited to the following: application system registers, initialization information and configurations files. The last two sections contain an identification of the specific image itself 320, and the last section contains an identification of the customer 322. The identification numbers allow for future reference of the created image, which is helpful for trouble shooting problems in the software configuration and in also adding delta images to the previously delivered image in order to upgrade existing applications.

Figure 4:
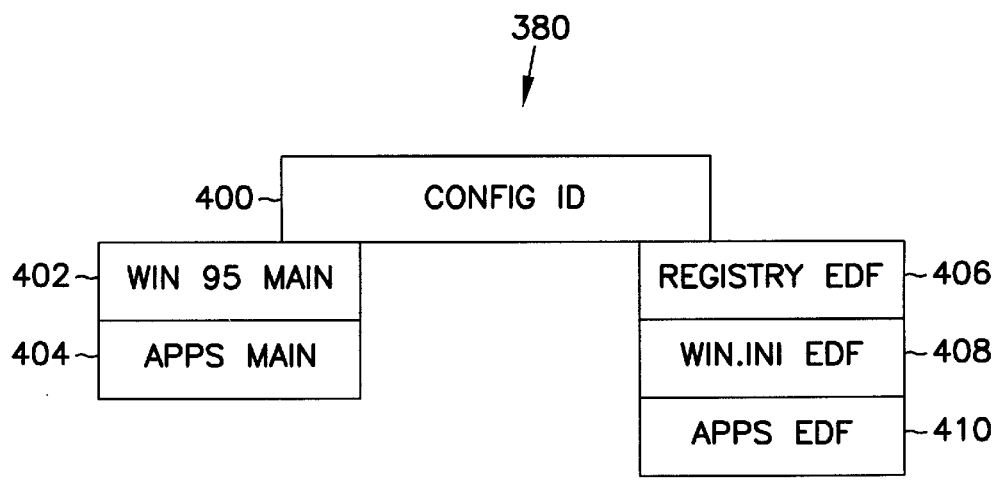
FIG. 4 illustrates an exemplary embodiment of an identification scheme for a disk image structure.

FIG. 4 illustrates an exemplary embodiment of an identification scheme 380 for a disk image structure. The image identification is a tree structure with a configuration identification number. Also included in the tree structure are underlying identification numbers corresponding to main files and underlying identification numbers corresponding to edited dynamic files (EDF).

More specifically, the identification scheme 380 includes a configuration number 380 identifying what the desired image is built from. It is the foundation from which the image builder 20 works from in creating the desired image. Once the configuration ID 380 is identified, then the main files corresponding to the operating system 402, e.g., Windows 95, and the desired application 404 are layered on top of the configuration ID 400 basic files. Edited dynamic files corresponding to registry settings 406, operating system initialization files 408, application EDF files 410.

An image build software delivery process has been described. The process creates an image of a customer's order in software before placing the image on a hard drive or other storage means for the customer. Once an image has been created, changes or deltas to the baseline image can easily be made without having to redefine the baseline. Adding a delta image to the baseline image allows the desired image to be achieved. This method provides levels of granularity wherein incremental changes can be made to a system without having to perform major work by redefining the baseline. This allows for easy upgrades and allows technical support to function efficiently.

Although specific embodiments have been illustrated and described herein, it will be appreciated by those skilled in the art that any arrangement which is calculated to achieve the same purpose may be substituted for the specific embodiment of the present invention. Therefore, it is manifestly intended that this invention be limited only by the following claims and equivalents.

What is claimed is:

1. A method of building a custom software configuration comprising:

receiving a desired software configuration;

surveying a plurality of images of preexisting software configurations and selecting a baseline software configuration corresponding to the desired software configuration;

comparing an image of the baseline software configuration with the desired software configuration; and generating an image of a set of changes based on the comparison, the image of a set of chances corresponding to the difference between the baseline software configuration and the desired software configuration.

2. The method of claim 1 further comprising broadcasting the image of the set of changes.

3. The method of claim 1 further comprising incorporating the image of the set of changes with the image of the baseline configuration to generate an image of a custom software configuration.

4. The method of claim 3 further comprising broadcasting the image of the custom software configuration.

5. The method of claim 4 wherein broadcasting comprises broadcasting by a satellite.

6. The method of claim 4 wherein broadcasting comprises broadcasting over the Internet.

7. The method of claim 4 wherein broadcasting comprises broadcasting using an Ethernet connection and a local area network.

8. The method of claim 1 wherein comparing an image of the baseline software configuration with the desired software configuration comprises examining a data stream of the baseline software configuration on a bit by bit basis.

9. The method of claim 1 wherein comparing an image of the baseline software configuration with the desired software configuration comprises examining a data stream of the baseline software configuration on a file by file basis.

10. The method of claim 1 further comprising storing the image of the set of changes on a computer readable medium.

11. A computerized system for building a custom software configuration comprising:
    a processor;
    a computer readable medium; and
    a plurality of computer instructions executed by the processor from the computer readable medium for:
        receiving a desired software configuration;
        surveying a plurality of images of preexisting software configurations and selecting a baseline software configuration similar to the desired software configuration;
        comparing an image of the baseline software configuration with the desired software configuration to determine a set of changes; and
        generating an image of the set of changes, the image of the set of changes corresponding to the difference between the baseline software configuration and the desired software configuration.

12. The computerized system of claim 11 wherein the plurality of computer instructions further comprises broadcasting the image of the set of changes.

13. The computerized system of claim 11 wherein the plurality of computer instructions further comprises incorporating the image of the set of changes with the image of the baseline software configuration to generate an image of a custom software configuration.

14. The computerized system of claim 13 wherein the plurality of computer instructions further comprises broadcasting the image of the custom software configuration.

15. The computerized system of claim 13 wherein the plurality of computer instructions further comprises broadcasting the image of the custom software configuration by a satellite.

16. The computerized system of claim 13 wherein the plurality of computer instructions further comprises broadcasting the image of the custom software configuration over the Internet.

17. The computerized system of claim 13 wherein the plurality of computer instructions further comprises broadcasting the image of the custom software configuration using an Ethernet connection and a local area network.

18. The computerized system of claim 11 wherein comparing an image of the baseline software configuration with the desired software configuration comprises examining a data stream of the baseline software configuration on a file by file basis.

19. The computerized system of claim 11 wherein comparing an image of the baseline software configuration with the desired software configuration comprises examining a data stream of the baseline software configuration on a bit by bit basis.

20. The computerized system of claim 11 wherein the plurality of computer instructions further comprises storing the image of the set of changes on the computer readable medium.

21. A machine readable medium having machine readable instructions stored thereon for causing a computer to perform the method comprising:
    receiving a desired software configuration;
    surveying a plurality of images of preexisting software configurations and selecting one of the plurality of images, wherein the selected image corresponds to a baseline software configuration and the baseline software configuration is similar to the desired software configuration;
    comparing the image of the baseline software configuration with the desired software configuration to determine a set of changes to be made to the image of the baseline software configuration, the set of changes corresponding to the difference between the baseline software configuration and the desired software configuration; and
    generating an image of the set of changes.

22. The machine readable medium of claim 21 wherein the machine readable instruction of generating an image of the set of changes further comprises incorporating the image of the set of changes with the image of the baseline configuration.

23. The machine readable medium of claim 21 further comprising machine readable instructions for broadcasting the image of the set of changes.

24. The machine readable medium of claim 21 further comprising machine readable instructions for storing the image of the set of changes on a computer readable medium.

25. A computerized network for creating and broadcasting a customized software configuration, the computerized network comprising:
    computer means for receiving information corresponding to a desired software configuration for a particular computer system;
    storage means comprising a plurality of available software configurations stored as images;
    image builder means coupled to the computer means and the storage means, the image builder means for receiving the desired software configuration, surveying the storage means to find an image of a software configuration similar to the desired software configurations comparing the image with an image of the desired software configuration to determine the image of a set of changes, incorporating the image of the set of changes with the found image, thus generating an image of the custom software configuration, and storing the image of the custom software configuration on the storage means; and
    image server means for receiving the image of the custom software configuration from the storage means and broadcasting the image of the custom software configuration to the particular computer system.

26. The computerized network of claim 25 wherein the image server means broadcasts the image via a wireless connection.

27. The computerized network of claim 25 wherein the image server means broadcasts the image via a wired connection.

28. A method of updating a software configuration of a computer system, the method comprising:
    receiving a desired software configuration;
    selecting an image of a preexisting software configuration from a plurality of images of preexisting software configurations, the selected image approximating the desired software configuration;

comparing the preexisting software configuration corresponding to the selected image with the desired software configuration to determine a set of changes; and generating an image of the set of changes, the image of the set of changes corresponding to the difference between the preexisting software configuration and the desired software configuration.

29. The method of updating a software configuration of claim 28 further comprising broadcasting the image of the set of changes.

30. The method of claim 29 wherein broadcasting comprises broadcasting via a wireless connection.

31. The method of claim 29 wherein broadcasting comprises broadcasting via a wired connection.

32. A computerized system for building a custom software configuration, the computerized system comprising:

a processor;

a storage device accessible to the processor having a plurality of available software configurations stored as images; and an image builder coupled to the processor and coupled to the storage device, the image builder for receiving a desired software configuration, searching the available software configurations, selecting one of the available software configurations similar to the desired software configuration, ring the image of the selected software configuration with the image desired software configuration, determining required changes such that the selected software configuration combined with the changes yields the desired software configuration and storing the image of the desired software configuration on the storage device.

33. The computerized system of claim 32 further comprising an image server coupled to the storage device, the image server for broadcasting the image of the desired software configuration.

34. The computerized system of claim 33 wherein the image server broadcasts via a satellite.

35. The computerized system of claim 33 wherein the image server broadcasts over the Internet.

36. The computerized system of claim 33 wherein the image server broadcasts using an Ethernet connection and a local area network.

37. A computerized method comprising:

receiving specifics of a computer system;

receiving a desired software configuration;

determining if an image of the desired configuration already exists, the image of the desired configuration determined as a function of the specifics and the desired software configuration;

if the desired configuration already exists, then sending notification that an image is available;

otherwise, selecting an appropriate baseline image from a plurality of baseline images;

selecting an appropriate delta image from a plurality of delta images, the appropriate baseline image and the appropriate delta image selected such that the combination of the appropriate baseline image and the appropriate delta image yield the image of the desired configuration;

storing the image of the desired configuration.

38. The method of claim 37 further comprising transferring the image of the desired configuration to the computer system.

39. The method of claim 37 wherein selecting an appropriate delta image comprises creating a delta image.

40. The method of claim 37 further comprising assigning a configuration number to each baseline image and each delta image.

41. The method of claim 37 wherein the desired configuration is rejected if the desired configuration is incompatible with the computer system.

* * * * *